(12) United States Patent
Muhammad et al.

(10) Patent No.: US 12,342,307 B2
(45) Date of Patent: *Jun. 24, 2025

(54) SATELLITE SIGNAL PROPAGATION DELAY VARIATION COMPENSATION

(71) Applicant: RAKUTEN MOBILE, INC., Tokyo (JP)

(72) Inventors: Awn Muhammad, Tokyo (JP); Tsunehiko Chiba, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/346,859

(22) Filed: Jul. 5, 2023

(65) Prior Publication Data

US 2023/0345402 A1    Oct. 26, 2023

Related U.S. Application Data

(63) Continuation of application No. 17/229,804, filed on Apr. 13, 2021, now Pat. No. 11,737,043.

(Continued)

(51) Int. Cl.
*H04W 84/06* (2009.01)
*H04B 7/185* (2006.01)
*H04W 56/00* (2009.01)

(52) U.S. Cl.
CPC ................. *H04W 56/005* (2013.01)

(58) Field of Classification Search
CPC .. H04B 7/18513; H04B 7/1855; H04B 7/185; H04B 17/30; H04B 17/364;

(Continued)

(56) References Cited

U.S. PATENT DOCUMENTS 6,317,077 B1 * 11/2001 Soleimani ................. G01S 5/12
342/357.77
6,417,800 B1    7/2002 Valio et al.
(Continued)

OTHER PUBLICATIONS

International Search Report in PCT/JP2021/017339, mailed Aug. 3, 2021, 8pp.

(Continued)

*Primary Examiner* — Andrew Wendell
(74) *Attorney, Agent, or Firm* — HAUPTMAN HAM, LLP

(57) ABSTRACT

Satellite signal propagation delay variation can be compensated by transmitting ephemeris data of a satellite and cell measurement window specifications to a terminal, receiving an indication from the terminal that a cell measurement signal will arrive at the terminal outside of a time frame defined by the cell measurement window specifications, modifying the cell measurement window specifications based on a difference in propagation delay between a serving cell, which defines the cell measurement window specifications, and a neighboring cell, which transmits the cell measurement signal, so that the cell measurement signal will arrive at the terminal within the time frame defined by the cell measurement window specifications, the satellite providing communication with the terminal for at least one of the serving cell and the neighboring cell, and transmitting modified cell measurement window specifications to the terminal.

15 Claims, 11 Drawing Sheets

Related U.S. Application Data

(60) Provisional application No. 63/137,916, filed on Jan. 15, 2021, provisional application No. 63/140,578, filed on Jan. 22, 2021.

(58) Field of Classification Search
CPC ... H04B 17/104; H04W 56/005; H04W 56/004; H04W 24/02; H04W 24/10; H04W 84/06
USPC ........................................................ 455/12.1
See application file for complete search history.

(56) References Cited

U.S. PATENT DOCUMENTS

| | | | |
|---|---|---|---|
| 8,879,605 B1* | 11/2014 | Shah | H04B 7/2668 455/456.2 |
| 10,536,315 B2* | 1/2020 | Bala | H04L 27/2613 |
| 11,737,043 B2* | 8/2023 | Muhammad | H04B 7/18513 455/12.1 |
| 2001/0008393 A1 | 7/2001 | Valio et al. | |
| 2007/0159388 A1 | 7/2007 | Allison et al. | |
| 2008/0274753 A1* | 11/2008 | Attar | H04W 64/00 342/357.29 |
| 2008/0285494 A1* | 11/2008 | Shin | H04W 52/0229 370/311 |
| 2011/0312339 A1* | 12/2011 | Kuningas | G01S 5/0226 455/456.1 |
| 2012/0053757 A1 | 3/2012 | Breshears | |
| 2013/0045755 A1* | 2/2013 | Davis | H04W 56/006 455/456.1 |
| 2013/0329630 A1 | 12/2013 | Becker | |
| 2017/0265204 A1* | 9/2017 | Paria | H04W 48/20 |
| 2018/0192295 A1* | 7/2018 | Mueck | H04W 16/14 |
| 2018/0213350 A1* | 7/2018 | Pon | H04W 4/02 |
| 2019/0037338 A1 | 1/2019 | Edge et al. | |
| 2019/0313357 A1* | 10/2019 | Wang | H04W 56/0045 |
| 2021/0175964 A1 | 6/2021 | Kusashima et al. | |
| 2022/0070811 A1* | 3/2022 | Tripathi | H04W 56/006 |
| 2022/0167397 A1 | 5/2022 | Thangarasa et al. | |
| 2022/0200695 A1* | 6/2022 | Ren | H04W 56/0045 |
| 2022/0263569 A1 | 8/2022 | Fan et al. | |
| 2022/0295434 A1* | 9/2022 | Wang | H04W 36/0058 |

OTHER PUBLICATIONS

Nokia, "On SMTC and measurements gaps for NTN", 3GPP TSG-RAN WG2 Meeting #113 Electronic R2-2100530, Jan. 25-Feb. 5, 2021, pp. 1-5, 6pp.

Sony, "Mobility management in NTN", 3GPP TSG-RAN WG2 Meeting #113 R2-2100915, Jan. 25-Feb. 5, 2021, pp. 1-2, 3pp.

Huawei et al. "Discussion on SSB measurement in Ntn", 3GPP TSG-RAN2 Meeting #108, Nov. 18-22, 2019, Reno, USA, Agenda Item: 6.6.4.3, 5pp.

Xiaomi, "Discussion on mobility management in NTN", 3GPP TSG RAN WG2 #113, e-Meeting, Jan. 25-Feb. 5, 2021, Agenda Item: 8.10.3.3, 8pp.

Extended European Search Report in EP Application No. 21919467.7 dated Nov. 28, 2024, 9pp.

* cited by examiner

SATELLITE SIGNAL PROPAGATION DELAY VARIATION COMPENSATION

CROSS-REFERENCE TO RELATED APPLICATIONS

The present application is a continuation of U.S. patent application Ser. No. 17/229,804 filed on Apr. 13, 2021, which claims the benefit of U.S. Provisional Patent Application Ser. No. 63/137,916, filed on Jan. 15, 2021, and U.S. Provisional Patent Application Ser. No. 63/140,578, filed on Jan. 22, 2021, each of which is hereby incorporated by reference in its entirety.

BACKGROUND

While a terminal is connected to a serving cell of a network, the terminal is provided windows of time during which the terminal can perform measurements on neighboring cell measurement signals. Some neighboring cells may utilize satellites for communication.

Due to the movement of satellites, propagation delay of signals, including measurement signals, transmitted to terminals constantly changes. Such delay can also change over time for a given terminal as a satellite moves. With this movement, the measurement signal timing will also drift.

If terminals are unable to perform measurements for neighboring cells, the terminal may not be able to report the neighboring cell measurements or perform conditional handover evaluation, affecting handover performance.

DESCRIPTION OF EXEMPLARY EMBODIMENTS

Figure 1A:
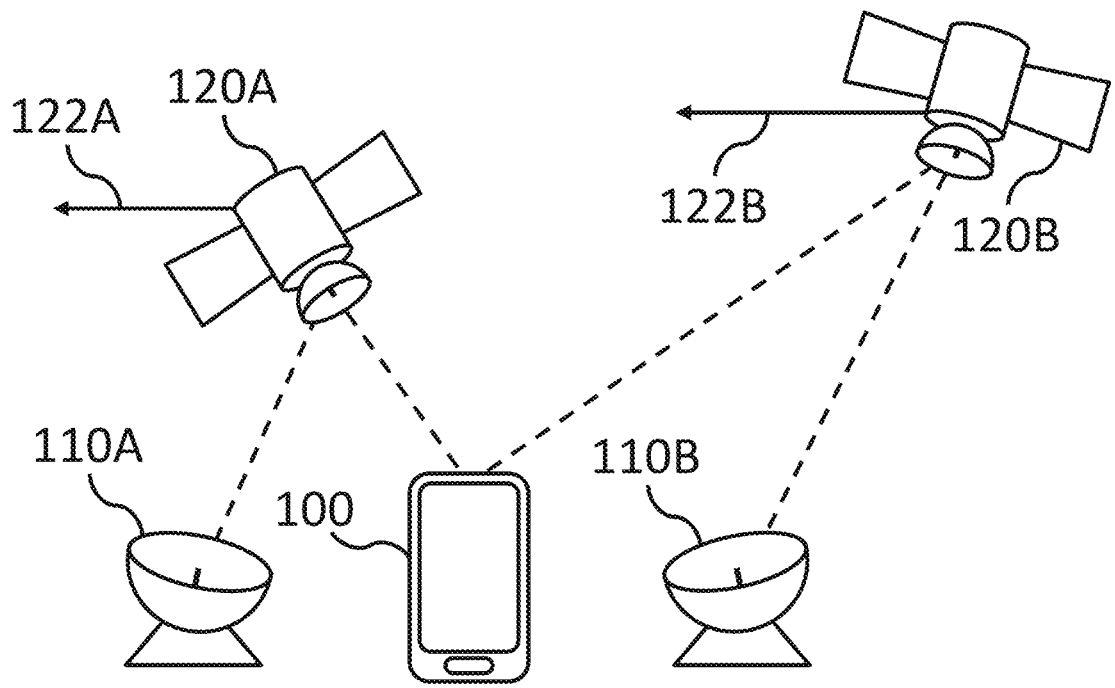
FIGS. 1A and 1B are schematic diagrams of a system for satellite signal propagation delay variation compensation, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

During handover of a terminal from a serving cell to a neighboring cell, the terminal is able to perform measurements in order to appropriately synchronize and connect to the neighboring cell. In some embodiments, such as when the serving cell and the neighboring cell are operating at different carrier frequencies, the terminal cannot simultaneously communicate with the serving cell and synchronize and connect to the neighboring cell. Accordingly, in some wireless technologies, such as 5G NR, measurement gaps are provided by the network that allow for the terminal to make the appropriate measurements with the neighboring cell in order to synchronize and connect to the neighboring cell. In some embodiments, such as 5G NR, the terminal performs measurements on Synchronization Signal Blocks (SSBs) of the neighboring cells during the measurement gaps. In some embodiments, the network provides the timing of neighboring cell SSBs using SSB-based Radio Resource Management (RRM) measurement time configuration (SMTC) protocol.

While a terminal is connected to a serving cell, the terminal is provided SMTC specifications by the network, the specifications defining windows of time during which the terminal can perform measurements on neighboring cell SSBs. The SMTC specifications include window periodicity, offset, and duration, and are based on the timing of the serving cell (also referred to as the primary cell (PCell)). The SMTC window periodicity (also referred to as Measurement Gap Repetition Period (MGRP)) can be 5, 10, 20, 40, 80, or 160 ms, while the SMTC window duration can be 1, 2, 3, 4, or 5 ms. The serving cell does not schedule communication with the terminal during the measurement gap. The network ensures that SSBs from neighboring cells are transmitted during the measurement gaps so that the terminal is able to measure the neighboring cell SSB strength and quality. In some embodiments, the terminal will measure neighboring cell measurements at a standardized interval.

In a low earth orbit (LEO) Non-Terrestrial Network (NTN) scenario, due to the movement of satellite cells, the propagation delay for neighboring satellite cell SSBs to reach a terminal constantly changes. The delays differ based on relative position of terminals on the ground. Neighboring satellite cell delay also changes over time for a terminal as satellite cells move. With this movement, the neighboring satellite cell SSB timing as measured by the terminal will also drift. The terminal will also move, but the effect of terminal movement on the ground is negligible compared to satellite speed.

In NTN scenarios, terminals experience different propagation delays between a serving satellite cell and neighboring satellite cells. In some situations, the SMTC window configuration and SSB receiving time are different for different satellite cells, such as between cells of satellites at different positions. Decreasing the size of the measurement gap allows more time to be dedicated to communication with the serving cell rather than measuring neighboring cells. However, due to small measurement gap size, for inter-frequency or even intra-frequency neighboring cells, the terminal has an increased risk of missing the SSB of the neighboring satellite cell for Radio Resource Management (RRM) measurements. An SMTC window duration is 5 ms at most, and thus a statically configured SMTC window is not be able to handle a larger variation in propagation delays, depending on where the SSB of a neighboring satellite cell is initially located in the SMTC window. Because terminals are not required to monitor for SSBs outside the configured SMTC window, measurement of neighboring satellite cells is challenging with current SMTC configuration options.

Variation in propagation delay exists for handovers between LEO satellites travelling at the same altitude, and is more pronounced between LEO satellites travelling at different altitudes, and even more pronounced between a LEO satellite and a geostationary earth orbit (GEO) satellite. Furthermore, due to differences in position, each terminal will experience a different variation in propagation delay between the same satellites over the same time period. As mentioned below in R2-2010795, SMTC window should be enhanced for NTN system as the SMTC window needs to follow the Delay variation between Serving and neighboring Cells/Satellites.

"In normal case of TN system, the SSB burst signal generated by neighbour cell is always detectable within the corresponding SMTC window configured via serving cell. There is no need for the UE to measure SSB burst signal outside the corresponding configured SMTC window. But for NTN system, based on the analysis, the SSB burst signal generated by neighbour cell may be outside the corresponding SMTC window configured via serving satellite. If the UE has the capability to acquire the propagation delay difference between serving and neighbour satellites, UE still can know when to detect the real SSB burst signal generated by neighbour cell even if the SSB burst signal is outside the corresponding configured SMTC window. If RAN2 don't want any enhancement for SMTC configuration for NTN, the UE should be allowed to search SSB burst signal generated by neighbour cell even outside the corresponding configured SMTC window."

The SMTC window for SSB measurement established by the serving cell should try to consider all possible SSB delays for all connected terminals.

Figure 1B:
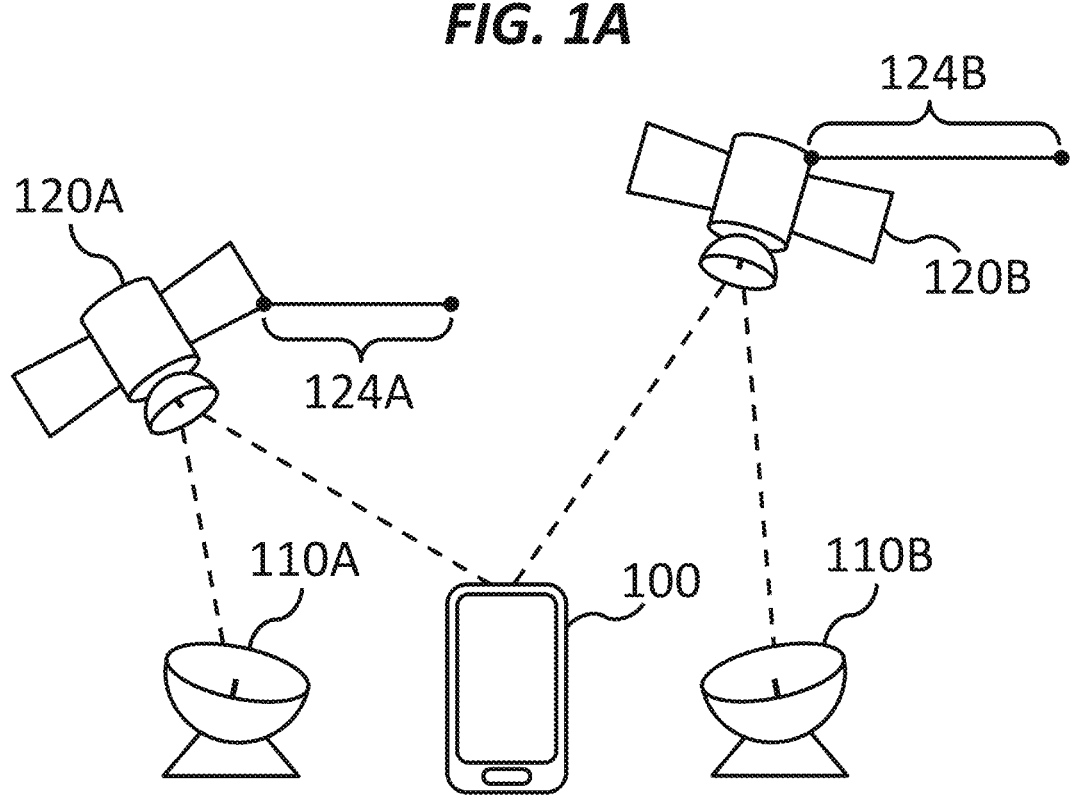

FIGS. 1A and 1B are schematic diagrams of a system for satellite signal propagation delay variation compensation, according to at least one embodiment of the present invention. FIG. 1A shows the system at an earlier time, and FIG. 1B shows the system at a later time.

In FIGS. 1A and 1B, satellite 120A, traveling in LEO, is currently providing communication for NTN gateway 110A, the serving cell of terminal 100, while satellite 120B, traveling in LEO at a higher altitude than satellite 120A, is providing communication for NTN gateway 110B, a potential target neighboring cell. In this scenario, satellite 120A is moving along trajectory 122A away from terminal 100, while satellite 120B, which is on a different trajectory 122B, is moving towards terminal 100. The propagation delay between satellite 120A and terminal 100 is designated dSAT1-UE(t), i.e. a function of time t, while the delay between satellite 120B and terminal 100 is designated dSAT2-UE(t). In some embodiments, satellite 120A and satellite 120B do not support NR protocols, and instead simply relay signals from terrestrial gateways NTN gateway 110A and NTN gateway 110B, respectively. As such, these satellites are referred to as "transparent," in some instances. In some embodiments with transparent satellites, the propagation delays also depend on the relative location of the gateway cell, which in some embodiments are NTN gateway 110A and NTN gateway 110B. In some embodiments, satellite 120A includes the serving cell of the cellular network and satellite 120B includes the neighboring cell of the cellular network, both fully supporting NR protocols, and therefore acting as satellite cells. Satellite 120A is connected to and moving towards NTN gateway 110A, while satellite 120B is connected to and moving towards NTN gateway 110B. FIG. 1A shows the relative position of the satellites at a first time $t_1$, and FIG. 1B shows the relative position of the satellites at a second time $t_2$. FIG. 1B shows that at time $t_2$, satellite 120A has changed position by distance 124A, and satellite B has changed position by distance 124B. The respective propagation delays between satellites and gateways are dSAT1-GW1(t) and dSAT1-GW2(t).

Due to the satellites' movement, the propagation delays vary with time. Table 1 provides example numbers in an embodiment where satellite 120A is travelling at an altitude of 600 km, satellite 120B is travelling at an altitude of 1500 km, and both satellite 120A and satellite 120B are transparent, based on estimated elevation angles between the satellite cells and the terrestrial objects.

TABLE 1

Propagation Delay Variations of Terminal-Gateway Communication Through Transparent Satellites

| | | Terminal X | | Respective Gateway | | Total |
| --- | --- | --- | --- | --- | --- | --- |
| | Time | Angle | Propagation Delay | Angle | Propagation Delay | Propagation Delay |
| Satellite X | $t_1$ | 70° | 2.1 ms | 40° | 3 ms | 5.1 ms |
| (Gateway X) | $t_2$ | 30° | 3.6 ms | 50° | 2.5 ms | 6.1 ms |
| Satellite Y | $t_1$ | 30° | 8 ms | 10° | 5.4 ms | 13.4 ms |
| (Gateway Y) | $t_2$ | 60° | 5.6 ms | 90° | 5 ms | 10.6 ms |

The timing of terminal 100 is based on the serving cell, NTN gateway 110A, which communicates through satellite 120A in FIGS. 1A and 1B. Therefore, terminal 100 will experience drift of the SSBs from satellite 120B.

Based on the geometry shown in FIG. 1 and Table 1, the total propagation delay between NTN-gateway 110A and terminal 100 changes from about 5.1 ms to 6.1 ms, while the total propagation delay between NTN gateway 110B and terminal 100 decreases from about 13.4 ms to 10.6 ms. Therefore, the difference in total propagation delay between the connection through satellite 120A and the connection through satellite 120B, as observed by terminal 100, changes from 8.3 ms at $t_1$ to 5.5 ms at $t_2$. Therefore, an SSB from NTN gateway 110B that was coordinated to arrive within an SMTC window according to a configuration established by NTN gateway 110A at $t_1$ will actually fall outside the SMTC window at $t_2$.

Figure 2A:
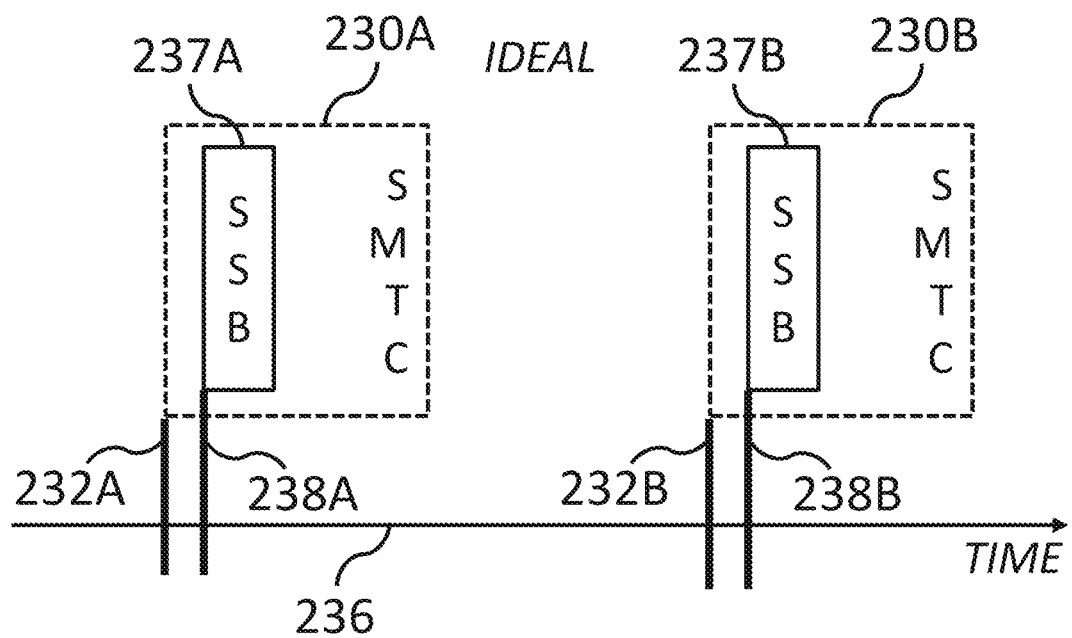
FIGS. 2A and 2B are diagrams showing the relative timings between measurement windows and measurement signals, according to at least one embodiment of the present invention.
Figure 2B:
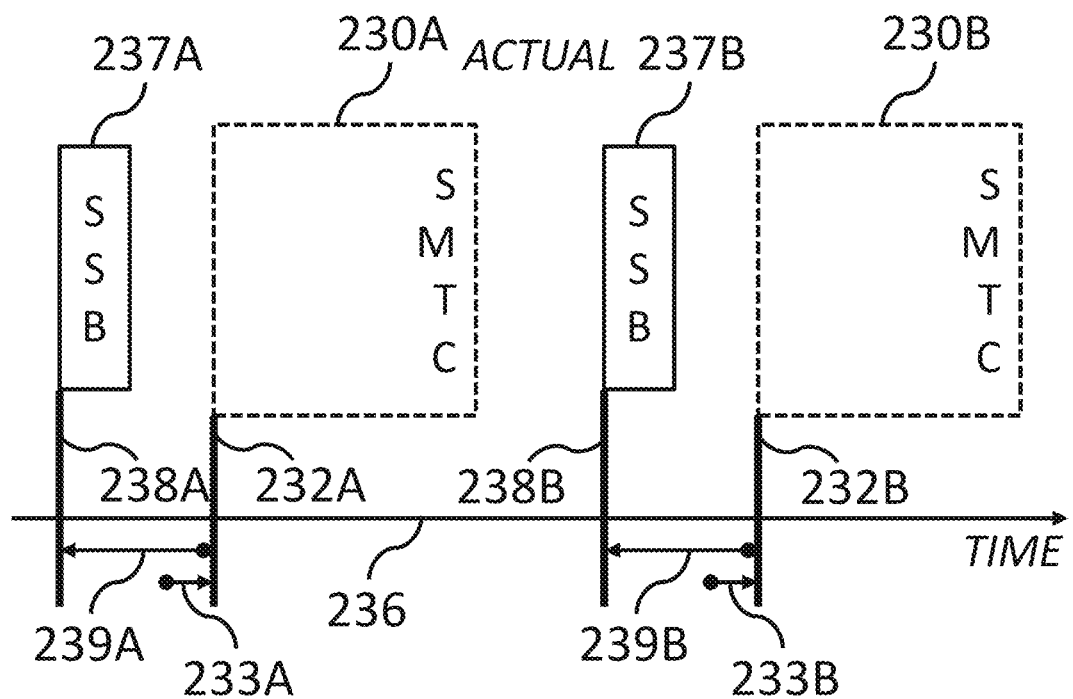

FIGS. 2A and 2B are diagrams showing the relative timings between measurement windows and measurement signals, according to at least one embodiment of the present invention. FIG. 2A shows the relative timings at an earlier time, such as $t_1$ in FIG. 1A, and FIG. 1B shows the relative timings at a later time, such as $t_2$ in FIG. 1B.

FIG. 2A shows a timeline 236 that was intended at the time the measurement window and measurement signals were coordinated. As coordinated, measurement window 230A opens at time 232A, and measurement signal 237A, sent at time 238A, is received before measurement window 230A closes. Similarly, measurement window 230B opens at time 232B, and measurement signal 237B, sent at time 238B, is received before measurement window 230B closes.

FIG. 2B shows a timeline 236 that results due to the change in propagation delay caused by the satellite ephemeris shown in FIGS. 1A and 1B. Because the total propagation delay between NTN-gateway 110A, the serving cell, and terminal 100 changes from about 5.1 ms to 6.1 ms, measurement window 230A starts at time 232A after a delay 233A of 1 ms. Because the total propagation delay between NTN-gateway 110B, the neighboring cell, and terminal 100 changes from about 13.4 ms to 10.6 ms, measurement signal 237A starts at time 238A by an advancement 239A of 2.8 ms. This results in measurement signal 237A arriving at terminal 100 outside of measurement window 230A. Unless compensated, terminal 100 would not receive measurement signal 237A. Measurement window 230B and measurement signal 237B are affected in substantially the same way.

Figure 3:
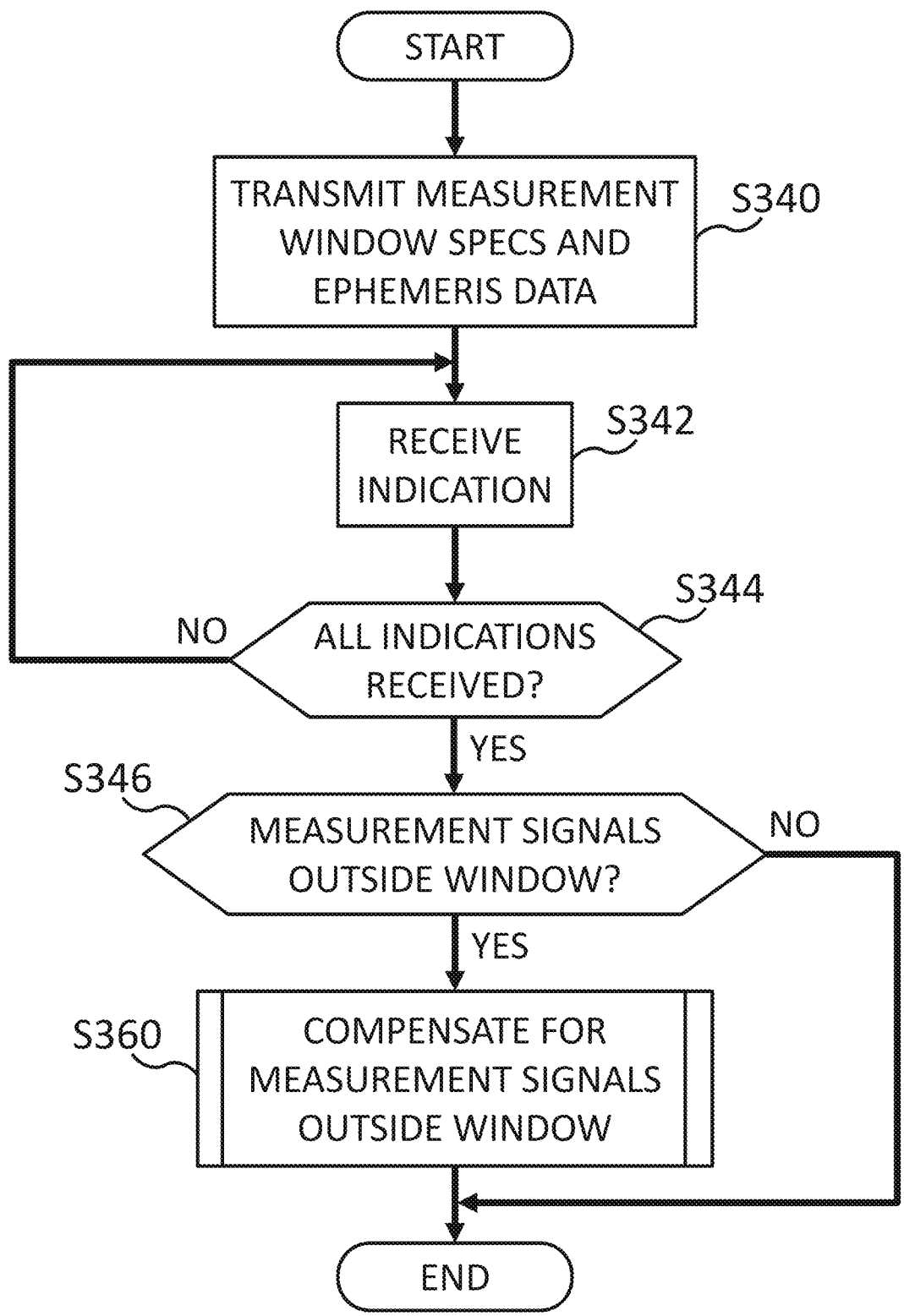
FIG. 3 is an operational flow for detecting satellite signal propagation delay variation, according to at least one embodiment of the present invention.

FIG. 3 is an operational flow for detecting satellite signal propagation delay variation, according to at least one embodiment of the present invention. In some embodiments, the operational flow provides a method of detecting satellite signal propagation delay variation by a serving cell in communication with a terminal. In some embodiments, the operations are performed by a detecting section or a correspondingly named sub-section thereof of a serving cell in communication with a terminal.

At S340, a detecting section or a sub-section thereof transmits ephemeris data of a satellite and cell measurement window specifications to a terminal. Where more than one terminal is connected to the serving cell, the detecting section transmits the ephemeris data and cell measurement window specifications to all connected terminals. In situations as in FIGS. 1A and 1B, where more than one among the serving cell and neighboring cells is using a satellite to communicate with a terminal, ephemeris data of each satellite is transmitted to the terminal.

In some embodiments, the cell measurement window specifications include periodicity, duration, and offset. In some embodiments where cell measurements are performed according to SMTC protocol, the serving cell defines the cell measurement window specifications within which neighboring cells transmit cell measurement signals. In these embodiments, the cell measurement window specifications include a periodicity mgrp, a gap duration mgl, a gap timing advance mgta, and an offset gapOffset. In these embodiments, the gap duration mgl effectively sets the duration of the measurement window, because the measurement window is a time frame within the gap that is padded on either side with non-transmission time. Also in the SMTC protocol embodiments, the offset gapOffset is in a range from zero to one less than the periodicity mgrp. For example, if mgrp is 80, then gapOffset ranges from 0 to 79. In SMTC protocol and other embodiments, the cell measurement window specifications are transmitted through Radio Resource Control (RRC) signaling as part of MeasConfig.

In some embodiments, the ephemeris data represents satellite position, satellite velocity, and reference position. In some embodiments where the satellite is transparent, the ephemeris data further represents gateway position. In some embodiments, the ephemeris data is also transmitted through RRC signaling. In these and some other embodiments, the range and resolution of each value in the ephemeris data can affect the spectral efficiency as well as the accuracy. In some embodiments, the satellite position is three coordinate values having a range of ±50,000 km and a resolution of 0.4 m, which utilizes 84 bits, the satellite velocity is three scalar values having a range of ±8 km/s and a resolution of 0.015 km/s, which utilizes 60 bits, and the reference position is three coordinate values having a range of ±6500 km and a resolution of 0.4 m, which utilizes 75 bits. In SMTC protocol and other embodiments, the ephemeris data is transmitted through Radio Resource Control (RRC) signaling as part of MeasObjectNR.

In some embodiments, the detecting section further transmits one or more report conditions. In some embodiments, the report conditions include delay report periodicity, a delay difference threshold value, and a gap sequence value. In some embodiments, the delay report periodicity is much larger than the measurement window periodicity, such as over 1000 ms. In some embodiments, the terminal can use the delay difference threshold value to determine whether or not to transmit a report, or whether or not to include an indication in the report. In some embodiments, two delay difference thresholds are used so that an alert is triggered upon the delay difference increasing beyond a higher threshold within 1 to 1000 ms, and the alert remains active until the delay difference is reduced beyond a lower threshold within 1 to 1000 ms. Having a higher activation threshold and a lower deactivation threshold will result in fewer false positives and false negatives. In some embodiments, the gap sequence determines which neighboring cell will transmit during which gap within the same gap period or measurement window. In some embodiments where the terminal performs more analysis, the report condition is a determination by a terminal that a measurement signal will arrive at the terminal outside of a time frame defined by the cell measurement window specifications. In some embodiments, the detecting section instructs the terminal to send a report in any event. In SMTC protocol and other embodiments, the report conditions are transmitted through Radio Resource Control (RRC) signaling as part of MeasObjectNR.

At S342, the detecting section or a sub-section thereof receives an indication from the terminal that a cell measurement signal will arrive at the terminal outside of a time frame defined by the cell measurement window specifications. In some embodiments, the indication is received through RRC signaling. In some embodiments, the indication includes information representing an offset between the measurement window and the measurement signal as perceived by the terminal that transmitted the indication, information that allows the serving cell to determine an offset between the measurement window and the measurement signal as perceived by the terminal that transmitted the indication, or any other information that can be used by serving cell to determine an adequate compensation. In some embodiments, the indication includes confirmation that a cell measurement signal will arrive at the terminal within the time frame defined by the cell measurement window specifications. In some embodiments, the indication includes a delay difference value representing a difference in propagation delay between a serving cell and a neighboring cell of a cellular network. In situations where more than one among the neighboring cells is using a satellite to communicate with a terminal, more than one indication may be received from a terminal. Where more than one terminal is connected to the serving cell, the detecting section may receive one or more indications from each connected terminal. In some embodiments, the indication includes a geographic location of the terminal, and in some of these embodiments there is no other information.

At S344, the detecting section or a sub-section thereof determines whether all indications have been received in response to the transmission of measurement window specifications and ephemeris data. In some embodiments, the detecting section refers to a time limit that terminals have to transmit indications, or other criteria for determining that all indications that will be considered have been received. In some embodiments, terminals send an indication regardless of whether a cell measurement signal will arrive at the terminal within the time frame defined by the cell measurement window specifications, and the detecting section waits until an indication has been received from each connected terminal. If the detecting section determines that all indications have been received according to the criteria, then the operational flow proceeds to S346 to continue the detection process. If the detecting section determines that the criteria has not been met, then the operational flow returns to S342 to receive further indications.

At S346, the detecting section or a sub-section thereof determines relative timings between the measurement window and the measurement signal of any neighboring cells as perceived by the connected terminals. In some embodiments, the connected terminals will provide the relative timings directly in the indication received at S342. In some embodiments, the detecting section determines whether an overlap exists based on other information provided by the terminal in the indication received at S342. In some embodiments where the indication received at S342 includes a geographic location of the terminal, the detecting section performs all calculations necessary to make the determination for each terminal with respect to each neighboring cell. If the detecting section determines that all measurement signals will be received within a measurement window as perceived by the terminals of all received indications, then the operational flow ends without further operations for compensation. If the detecting section determines that measurement signals will be received outside a measurement window of a connected terminal, then the operational flow proceeds to S360 to perform compensation. In some embodiments, the decision at S346 is not based on whether a single measurement signal will arrive at a single terminal outside of the measurement window, but instead is based on a threshold amount of terminals, neighboring stations, some weighted factor criteria, etc.

At S360, a compensating section of the serving cell compensates for the measurement signals that will arrive at terminals outside of the measurements windows defined by the measurement window specifications sent at S340. In some embodiments, the compensating section or a subsection thereof modifies the cell measurement window specifications so that cell measurement signals transmitted from the satellite will arrive at terminals within the time frame defined by the cell measurement window specifications. Some embodiments of the compensation operation at S360 are described in more detail with respect to FIG. 5.

Figure 4:
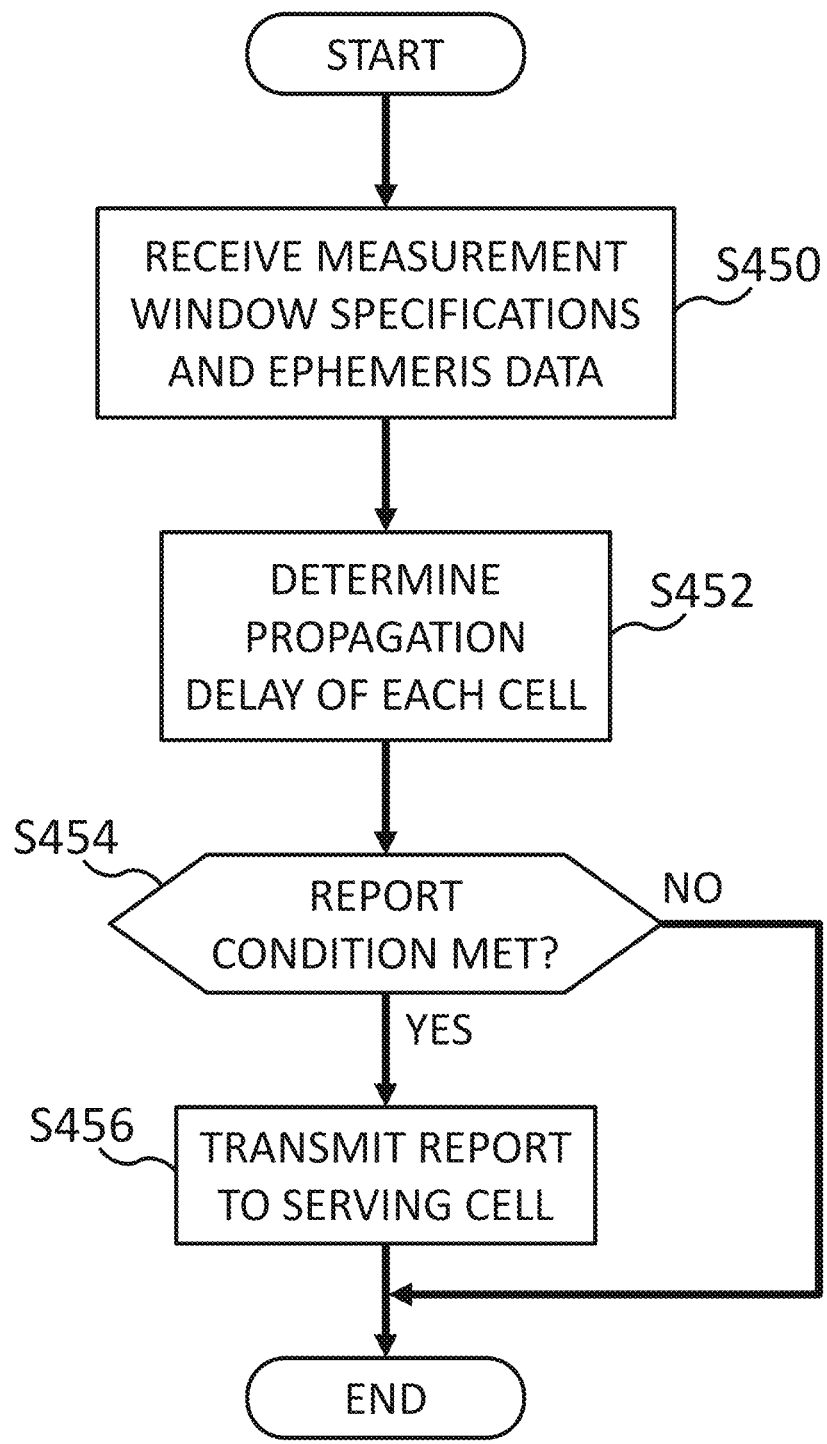
FIG. 4 is an operational flow for reporting satellite signal propagation delay variation, according to at least one embodiment of the present invention.

FIG. 4 is an operational flow for reporting satellite signal propagation delay variation, according to at least one embodiment of the present invention. In some embodiments, the operational flow provides a method of reporting satellite signal propagation delay variation by a terminal connected to a serving cell. In some embodiments, the operations are performed by a reporting section or a correspondingly named sub-section thereof of a terminal.

At S450, the reporting section or a subsection thereof receives ephemeris data of a satellite and cell measurement window specifications from a serving cell of a cellular network. The ephemeris data of a satellite and cell measurement window specifications are substantially similar to those described with respect to S340 of FIG. 3. In some embodiments, the reporting section further receives a report condition, such as the report conditions described with respect to S340 of FIG. 3, or an instruction to send a report in any event.

At S452, the reporting section or a subsection thereof determines the propagation delay of each neighboring cell. In some embodiments, the reporting section determines a difference in propagation delay between the serving cell and a neighboring cell of the cellular network based on the ephemeris data and a geographic location of the terminal. In some embodiments, the determining section obtains the geographic location from a Global Positioning System (GPS) chip within the terminal, direct user input, or other ways without using the cellular network. In this manner, the reporting section makes determinations without providing the geographic location of the terminal to the cellular network, or allowing the cellular network to obtain the geographic location of the terminal. In some embodiments, the reporting section makes no further determinations other than the difference in propagation delay, such as in response to the report condition being based on the difference in propagation delay. In some embodiments, the reporting section also reports the propagation delay variation, because the propagation delay has a possibility of being different at the time the measurement signal arrives at the terminal. In some embodiments, the serving cell is a non-terrestrial gateway communicating with the terminal through the satellite. In some of these embodiments, the reporting section determines the difference in propagation delay further based on a geographic location of the non-terrestrial gateway.

In some embodiments, the reporting section uses the propagation delay to further determine whether the cell measurement signal will arrive outside of a time frame defined by the cell measurement window specifications, such as in response to the report condition being based on such a determination. In some circumstances, the reporting section determines that a cell measurement signal will arrive outside of a time frame defined by the cell measurement window specifications.

At S454, the reporting section or a subsection thereof determines whether a report condition has been met. In some embodiments, the reporting section refers to a report condition or report instruction received from the serving cell along with the cell measurement window specifications and ephemeris data. In some embodiments, the reporting section refers to an internal report condition. In some embodiments in which the report condition is a delay difference threshold value, the reporting section determines, for each neighboring cell, whether the propagation delay difference between the neighboring cell and the serving cell exceeds the delay difference threshold value. If the reporting section determines that the report condition has been met, then the operational flow proceeds to S456 to transmit a report. If the reporting section determines that the report condition has not been met, then the operational flow ends without transmitting a report.

At S456, the reporting section or a subsection thereof transmits a report to the serving cell. In some embodiments, the report is transmitted through RRC signaling. In some embodiments, the reporting section transmits an indication to the serving cell that the cell measurement signal will be received outside of the window defined by the cell measurement window specifications in the report. In some embodiments, the report includes an indication that the propagation delay difference between the neighboring cell and the serving cell exceeds the delay difference threshold value. In some embodiments, the report indicates that the report condition has not been met, such as when the serving cell instructs the terminal to send a report in any event.

Figure 5:
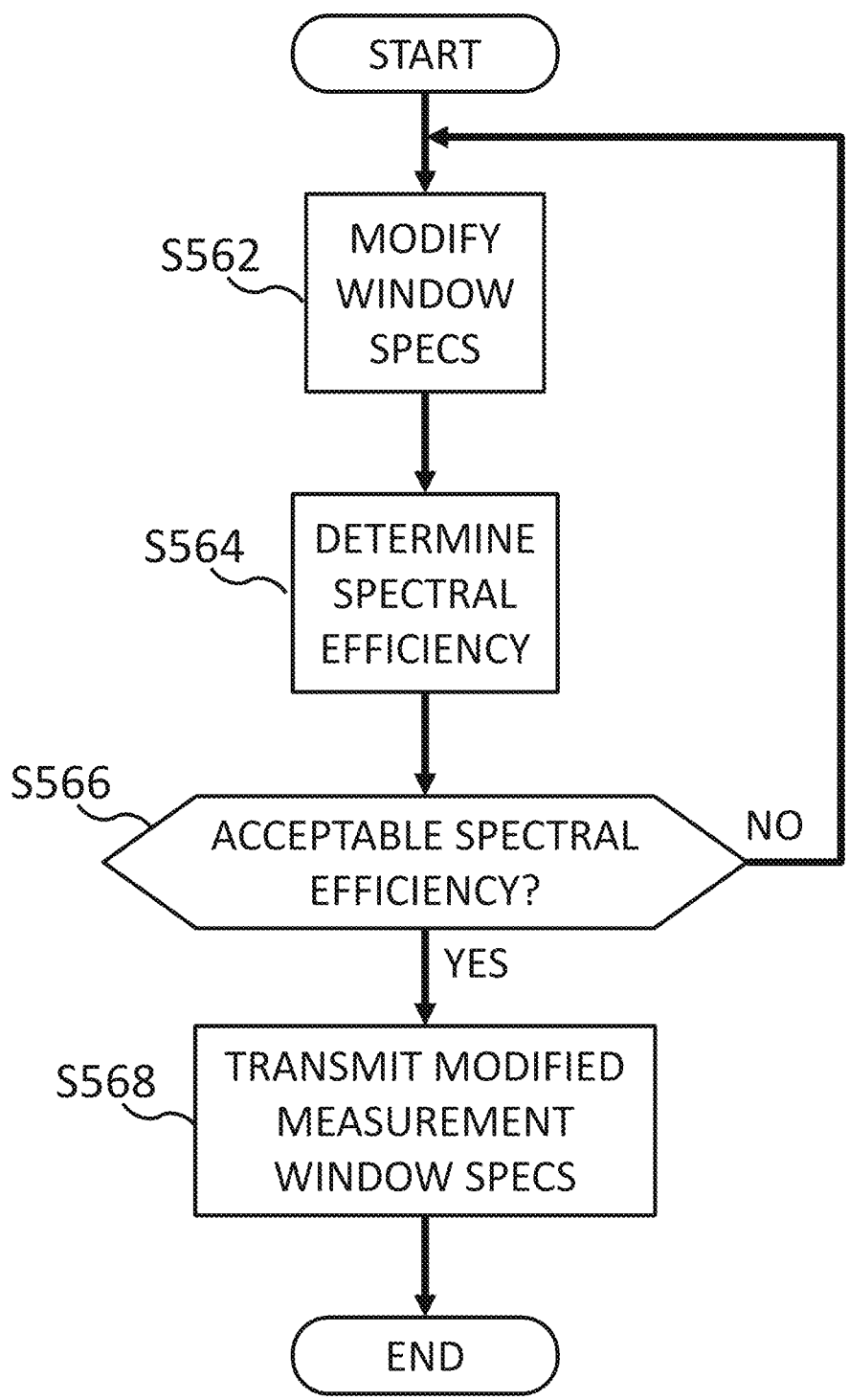
FIG. 5 is an operational flow for compensating satellite signal propagation delay variation, according to at least one embodiment of the present invention.

FIG. 5 is an operational flow for compensating satellite signal propagation delay variation, according to at least one embodiment of the present invention. In some embodiments, the operational flow provides a method of compensating satellite signal propagation delay variation by a serving cell. In some embodiments, the operations are performed by a compensating section or a correspondingly named subsection thereof of the serving cell.

At S562, the compensating section or a subsection thereof modifies the cell measurement window specifications. In some embodiments, the compensating section modifies at least one of periodicity, duration, and offset. In some embodiments, the compensating section specifies additional measurement window specifications, such as an additional measurement window having a periodicity, duration, and offset. In some embodiments, the compensating section determines a modification that will cause at least one measurement signal from all neighboring cells to arrive at all connected terminals within time frames defined by the measurement window specifications. In some embodiments, the compensating section determines a modification that will cause at least one measurement signal from a majority of neighboring cells to arrive at a majority of connected terminals within time frames defined by the measurement window specifications. In some embodiments, the compensating section determines a separate modification for each neighboring cell, each communication channel, or each frequency band.

At S564, the compensating section or a subsection thereof determines a spectral efficiency of the cell measurement window specifications modified at S562. In some embodiments, the spectral efficiency is a measurement of the amount of bandwidth a terminal consumes for purposes related to establishing and maintaining network communication. In some embodiments where neighboring cells communicate on different frequencies than the serving cell, this is directly related to the amount of time spent establishing and maintaining network communication, such as awaiting reception of measurement signals. In some embodiments, the compensating section determines a separate spectral efficiency for each neighboring cell, each communication channel, or each frequency band.

At S566, the compensating section or a subsection thereof determines whether the spectral efficiency is acceptable. In some embodiments, the compensating section determines whether the spectral efficiency of the cell measurement window specifications modified at S564 is acceptable by comparing the spectral efficiency to a threshold spectral efficiency value. If the compensating section determines that the spectral efficiency of the cell measurement window specifications modified at S564 is acceptable, then the operational flow proceeds to modified measurement window specification transmission at S568. If the compensating section determines that the spectral efficiency of the cell measurement window specifications modified at S564 is not acceptable, then the operational flow proceeds to further modification of the measurement window specifications at S562.

As iterations of S562, S564, and S566 proceed, different modifications are attempted until an acceptable spectral efficiency is achieved. In some embodiments in which the spectral efficiency is compared with a threshold spectral efficiency value, modifying the cell measurement window specifications includes determining that the spectral efficiency of the modified cell measurement window specifications is above the threshold spectral efficiency value. In some embodiments, an algorithm or formula is used to determine a modification having a maximum spectral efficiency. In some embodiments, an algorithm or formula is used to determine a modification of the cell measurement window specifications that balances spectral efficiency with reception of measurement signals. For example, a modification that causes at least one measurement signal from all neighboring cells to arrive at all connected terminals significantly reduces spectral efficiency, especially in situations where there are many connected terminals.

At S568, the compensating section or a subsection thereof transmits the cell measurement window specifications modified at S562 to connected terminals. In some embodiments, the modified cell measurement window specifications are transmitted through RRC signaling. In some embodiments, the modified cell measurement window specifications are substantially similar to those transmitted at S340 of FIG. 3, but without the ephemeris data and report condition. In some embodiments, the modified cell measurement window specifications include separate modifications for each neighboring cell, each communication channel, or each frequency band.

Figure 6:
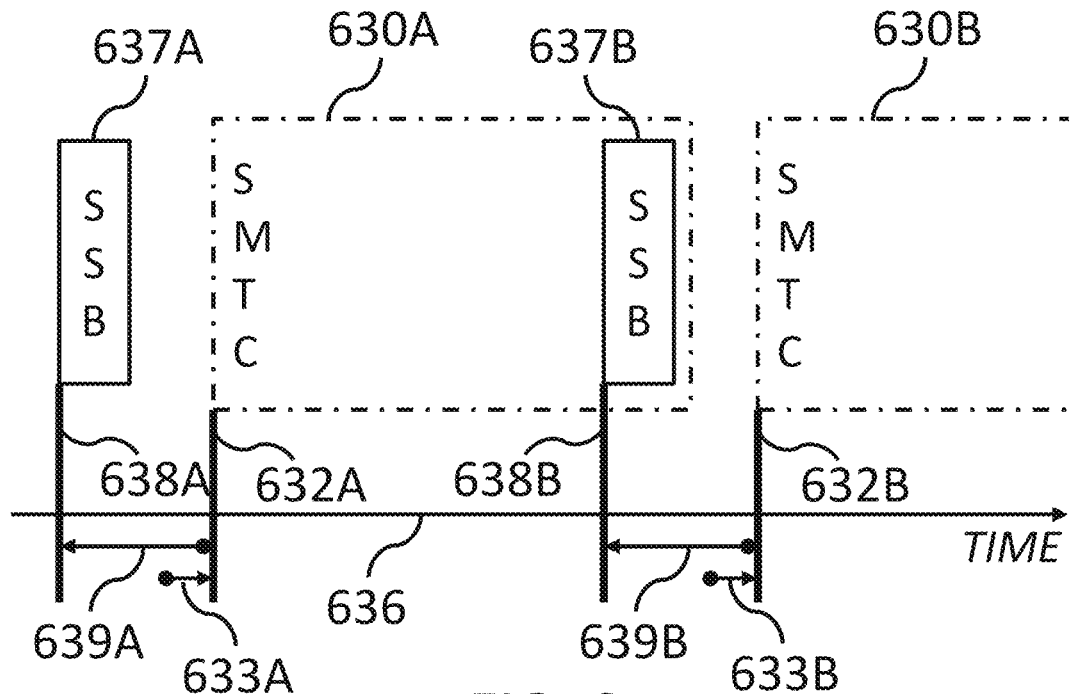
FIG. 6 is a diagram showing the relative timings between measurement windows having modified duration and measurement signals, according to at least one embodiment of the present invention.

FIG. 6 is a diagram showing the relative timings between measurement windows having modified duration and measurement signals, according to at least one embodiment of the present invention. Timeline 636 includes the relative timings at a later time, such as $t_2$ in FIG. 1B. Similar to the description with respect to FIG. 2B, because the total propagation delay between NTN-gateway 110A, the serving cell, and terminal 100 changes from about 5.1 ms to 6.1 ms, measurement window 630A starts at time 632A after a delay 633A of 1 ms. Because the total propagation delay between NTN-gateway 110B, the neighboring cell, and terminal 100 changes from about 13.4 ms to 10.6 ms, measurement signal 637A starts at time 638A by an advancement 639A of 2.8 ms. However, instead of measurement signal 637A arriving at terminal 100 outside of measurement window 630A, the cell measurement window specifications were modified by the serving cell to have a longer duration. Due to the modification, measurement window 630A still starts at time 632A, but remains open long enough to include time 638B, when measurement signal 637B arrives at terminal 100.

In some embodiments, the measurement signals are advanced and the measurement windows are delayed from the perspective of the terminal. The increase in duration of the measurement window causes a subsequent measurement signal to fall within the measurement window. In such cases, unless the advance of the measurement signal and delay of the measurement window totals more than half of the periodicity, the increase in duration used to capture the subsequent measurement signal reduces the spectral efficiency below 50%. In other words, the terminal would consume more than half of the connection time or bandwidth just for maintaining the network connection. A spectral efficiency of less than 50% is not likely to be acceptable in many embodiments, and therefore modifying the cell measurement window specifications to increase the duration have a greater probability of resulting in an acceptable spectral efficiency in other situations. For example, in some embodiments where the measurement signals are delayed and the measurement windows are advanced from the perspective of the terminal, a modification of the cell measurement window specifications to increase the duration have a greater probability of resulting in an acceptable spectral efficiency.

Figure 7:
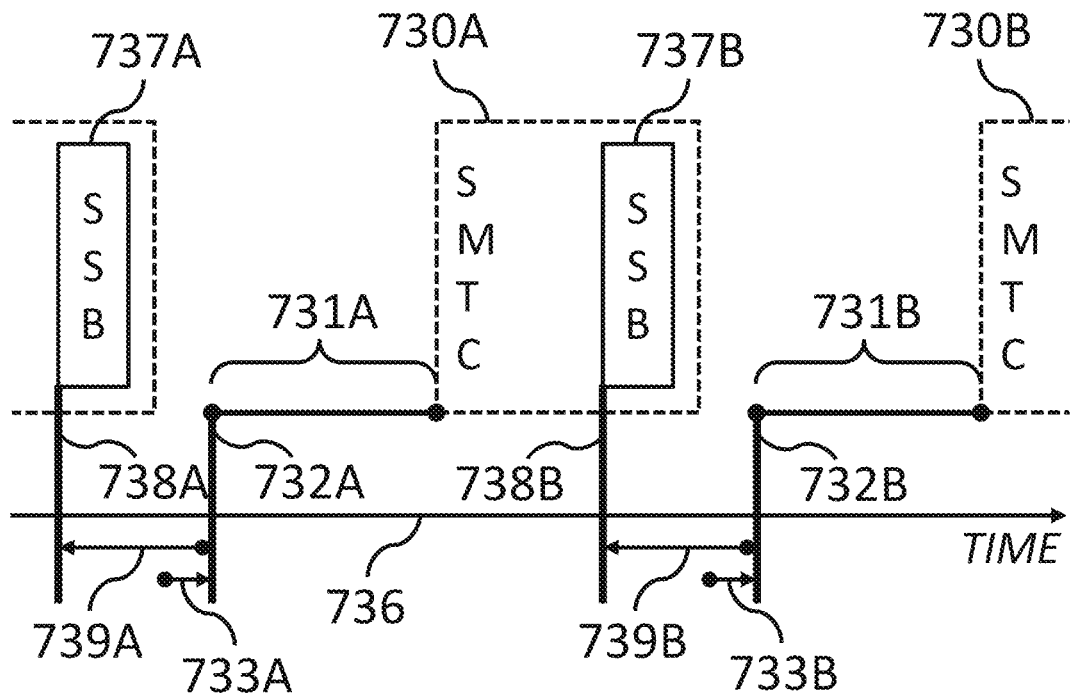
FIG. 7 is a diagram showing the relative timings between measurement windows having modified offset and measurement signals, according to at least one embodiment of the present invention.

FIG. 7 is a diagram showing the relative timings between measurement windows having modified offset and measurement signals, according to at least one embodiment of the present invention. Timeline 736 includes the relative timings at a later time, such as $t_2$ in FIG. 1B. Similar to the description with respect to FIG. 2B, because the total propagation delay between NTN-gateway 110B, the neighboring cell, and terminal 100 changes from about 13.4 ms to 10.6 ms, measurement signal 737A starts at time 738A by an advancement 739A of 2.8 ms. The total propagation delay between NTN-gateway 110A, the serving cell, and terminal 100 changes from about 5.1 ms to 6.1 ms. However, an offset 731A has been introduce into the cell measurement window specifications, as modified. As a result, measurement window 730A starts after time 732A by offset 731A, which causes measurement window 730A to include time 738B, when measurement signal 737B arrives at terminal 100.

In some embodiments, the measurement signals are advanced and the measurement windows are delayed from the perspective of the terminal. The introduction of an offset of the measurement window, which is also effectively an increase in offset from zero to a positive value, causes a subsequent measurement signal to fall within the measurement window. Because the duration and periodicity of the measurement window remains constant, and no other windows are introduced, the spectral efficiency also remains constant. In other words, the terminal would consume no more connection time or bandwidth just for maintaining the network connection than before the offset was introduced. An unchanged spectral efficiency after modification of cell measurement window specifications has a greater probability of being acceptable than a decreased spectral efficiency. However, in some embodiments where many terminals are connected to a serving cell in which many neighboring cells communicate via satellite, relative timings among measurement signals and measurement windows from perspectives of different connected terminals will advance and delay in different directions in different amounts. Therefore, a modification in the cell measurement window specifications to introduce or increase the offset would have a lower probability of significantly increasing the amount of neighboring cells transmitting at least one measurement signal that arrives at connected terminals in embodiments with many terminals, many satellites, or both.

Figure 8:
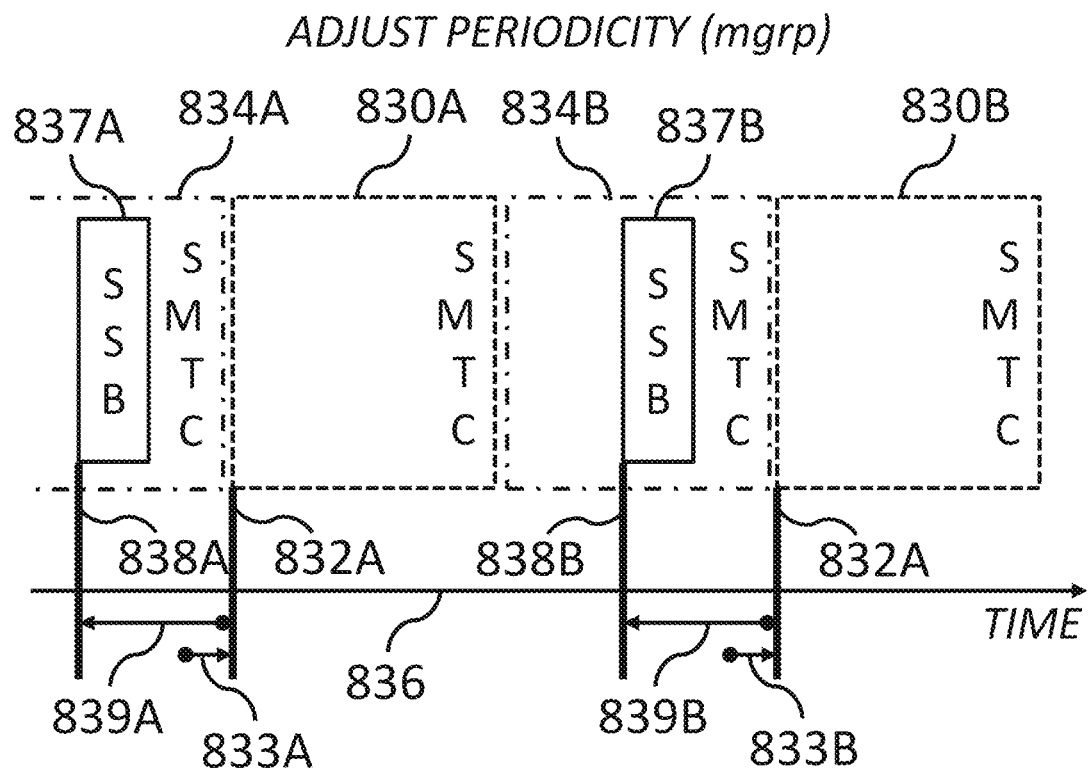
FIG. 8 is a diagram showing the relative timings between measurement windows having modified periodicity and measurement signals, according to at least one embodiment of the present invention.

FIG. 8 is a diagram showing the relative timings between measurement windows having modified periodicity and measurement signals, according to at least one embodiment of the present invention. Timeline 836 includes the relative timings at a later time, such as $t_2$ in FIG. 1B. Similar to the description with respect to FIG. 2B, because the total propagation delay between NTN-gateway 110A, the serving cell, and terminal 100 changes from about 5.1 ms to 6.1 ms, measurement window 830A starts at time 832A after a delay 833A of 1 ms. Because the total propagation delay between NTN-gateway 110B, the neighboring cell, and terminal 100 changes from about 13.4 ms to 10.6 ms, measurement signal 837A starts at time 838A by an advancement 839A of 2.8 ms. However, instead of measurement signal 837A arriving at terminal 100 outside of any measurement window, the cell measurement window specifications were modified by the serving cell to have a shorter periodicity. Due to the modification, measurement window 830A still starts at time 832A and ends before measurement signal 837B arrives at terminal 100, but the decrease in periodicity causes another measurement window 834B to be open when measurement signal 837B arrives at terminal 100.

In some embodiments, the measurement signals are advanced and the measurement windows are delayed from the perspective of the terminal. The decrease in periodicity of the measurement window, which is effectively an increase in the rate of measurement windows with respect to time, causes the spectral efficiency to decrease, because connected terminals would consume more time awaiting measurement signals. However, in some embodiments where many terminals are connected to a serving cell in which many neighboring cells communicate via satellite, a modification of the cell measurement window specifications to double the rate of measurement windows would have a greater probability of significantly increasing the amount of neighboring cells transmitting at least one measurement signal that arrives at connected terminals than modifications that do not increase the amount of time consumed by connected terminals awaiting measurement signals.

Figure 9:
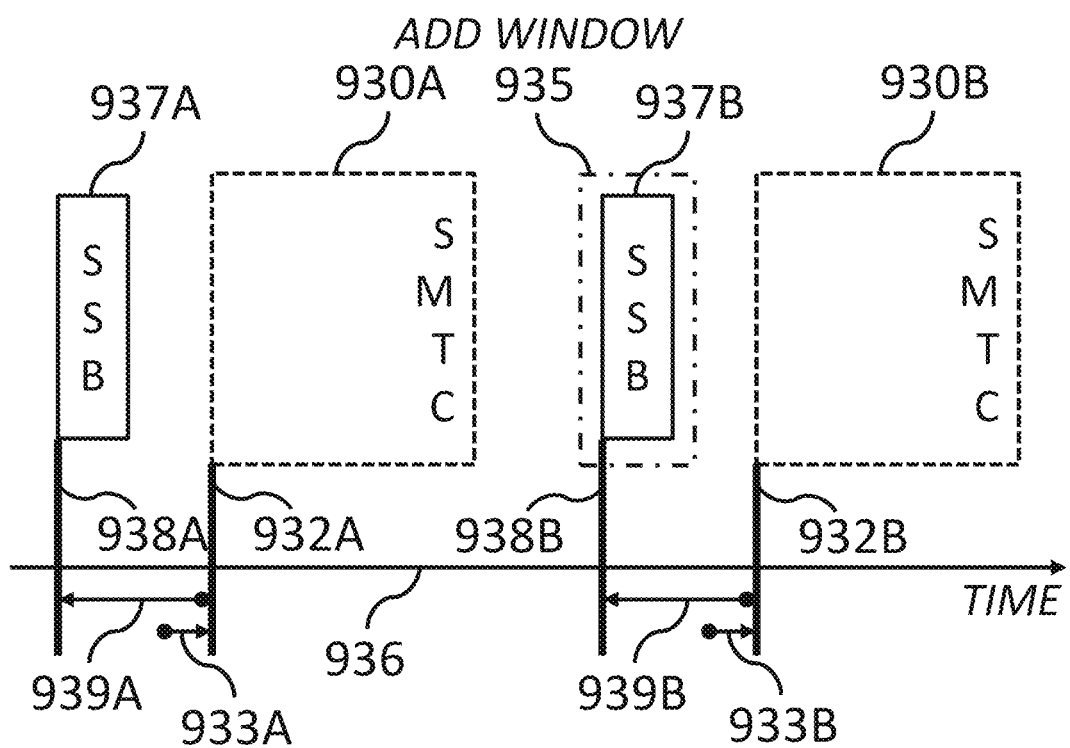
FIG. 9 is a diagram showing the relative timings between initially configured measurement windows, additional measurement windows, and measurement signals, according to at least one embodiment of the present invention.

FIG. 9 is a diagram showing the relative timings between initially configured measurement windows, additional measurement windows, and measurement signals, according to at least one embodiment of the present invention. Timeline 936 includes the relative timings at a later time, such as $t_2$ in FIG. 1B. Similar to the description with respect to FIG. 2B, because the total propagation delay between NTN-gateway 110A, the serving cell, and terminal 100 changes from about 5.1 ms to 6.1 ms, measurement window 930A starts at time 932A after a delay 933A of 1 ms. Because the total propagation delay between NTN-gateway 110B, the neighboring cell, and terminal 100 changes from about 13.4 ms to 10.6 ms, measurement signal 937A starts at time 938A by an advancement 939A of 2.8 ms. However, instead of measurement signal 937A arriving at terminal 100 outside of any measurement window, the cell measurement window specifications were modified by the serving cell to have additional measurement window specifications. In some embodiments, the additional window measurement specifications include periodicity, duration, and offset in addition to the periodicity, duration, and offset of the original window measurement specifications, but having different values. Due to the modification, measurement window 930A still starts at time 932A and ends before measurement signal 937B arrives at terminal 100, but the additional window measurement specifications causes another measurement window 935 to be open when measurement signal 937B arrives at terminal 100.

In some embodiments, the measurement signals are advanced and the measurement windows are delayed from the perspective of the terminal. The additional window measurement specifications, which effectively adds measurement windows, causes the spectral efficiency to decrease, because connected terminals would consume more time awaiting measurement signals. However, in some embodiments where many terminals are connected to a serving cell in which many neighboring cells communicate via satellite, a modification of the cell measurement window specifications to add measurement windows would have a greater probability of significantly increasing the amount of neighboring cells transmitting at least one measurement signal that arrives at connected terminals than modifications that do not increase the amount of time consumed by connected terminals awaiting measurement signals.

Figure 10:
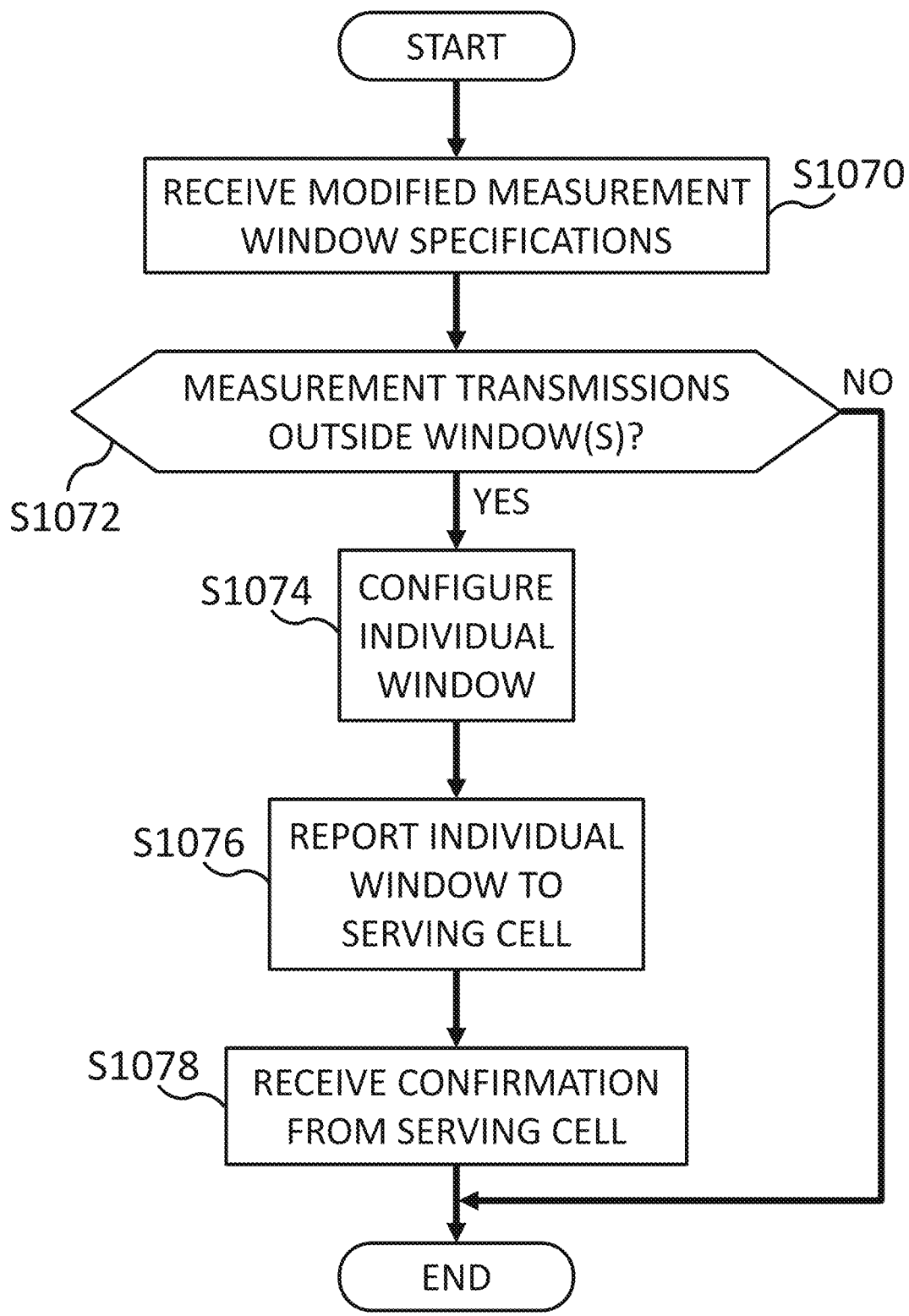
FIG. 10 is an operational flow for further compensating satellite signal propagation delay variation, according to at least one embodiment of the present invention.

FIG. 10 is an operational flow for further compensating satellite signal propagation delay variation, according to at least one embodiment of the present invention. In some embodiments, the operational flow provides a method of compensating satellite signal propagation delay variation by a terminal connected to a serving cell. In some embodiments, the operations are performed by a compensating section or a correspondingly named sub-section thereof of the terminal.

At S1070, the compensating section or a subsection thereof receives modified window measurement specifications from the serving cell. In some embodiments, the modified window measurements specifications are received through RRC signaling. In some embodiments, the modified cell measurement window specifications are modified as described in S562 of FIG. 5.

At S1072, the compensating section or a subsection thereof determines whether the measurement signals of any neighboring cells will arrive outside of measurement windows defined by the modified cell measurement window specifications. Because modification of cell measurement window specifications to ensure at least one measurement signal from all neighboring cells will arrive at all connected terminals results in an unacceptable spectral efficiency in some situations, some connected terminals will determine that the modified cell measurement window specifications still result in measurement signals of one or more neighboring cells arriving outside of the measurement windows. If the compensating section determines that measurement signals of one or more neighboring cells will arrive outside of the measurement windows, then the operational flow proceeds to individual measurement window configuration at S1074. If the compensating section determines that at least one measurement signal of all neighboring cells will arrive within the measurement windows, then the operational flow ends without individual measurement configuration.

At S1074, the compensating section or a subsection thereof configures an individual measurement window. In some embodiments, the compensating section configures individual measurement window specifications that define one or more time frames within which only the individual terminal awaits arrival of measurement signals. During time frames defined by individual measurement window specifications, the serving will not communicate with the terminal, but will continue to communicate with other terminals. In this manner, individual measurement window specifications cause much less reduction of the spectral efficiency for cells and other terminals than the terminal that configured the individual measurement window specifications. In some embodiments in which the measurement signals are advanced and the measurement windows are delayed from the perspective of the terminal, the compensating section configures an individual measurement window comparable to measurement window 935 of FIG. 9. In some embodiments, the individual measurement window specifications include periodicity, duration, and offset, which may be configured to receive multiple measurement signals, each measurement signal from a different neighboring cell. In some embodiments, the individual measurement window specifications only include a starting time and a duration, resulting in a single individual measurement window, which has a greater probability of resulting in a greater spectral efficiency than in embodiments where the individual measurement window specifications result in multiple individual measurement windows, but may allow reception of fewer measurement signals.

At S1076, the compensating section or a subsection thereof transmits a report of individual measurement window specifications to the serving cell. In some embodiments the individual measurement window specifications are transmitted through RCC signaling.

At S1078, the compensating section or a subsection thereof receives confirmation from the serving cell. In some embodiments, the confirmation received from the serving cell confirms that the serving cell will not communicate with the terminal during any time frames defined by the individual measurement window specifications. In other words, the serving cell provides measurement gaps for the terminal that coincide with any time frames defined by the individual measurement window specifications. In some embodiments the confirmation is received through RCC signaling.

In some embodiments, a serving cell may perform operations S1072, S1074, S1076, and S1078. In some of these embodiments, the computational load on the serving cell is increased, resulting in the serving cell utilizing more computational resources. In some of these embodiments, the terminals send the serving cell more detailed information about the relative timings of measurement windows and measurement signals, such as during transmission of a propagation delay report similar to operation S456 of FIG. 4. In some of these embodiments, the serving cell transmits the individual cell measurement window specifications to each terminal during transmission of modified cell measurement window specifications similar to operation S568 of FIG. 5.

Figure 11:
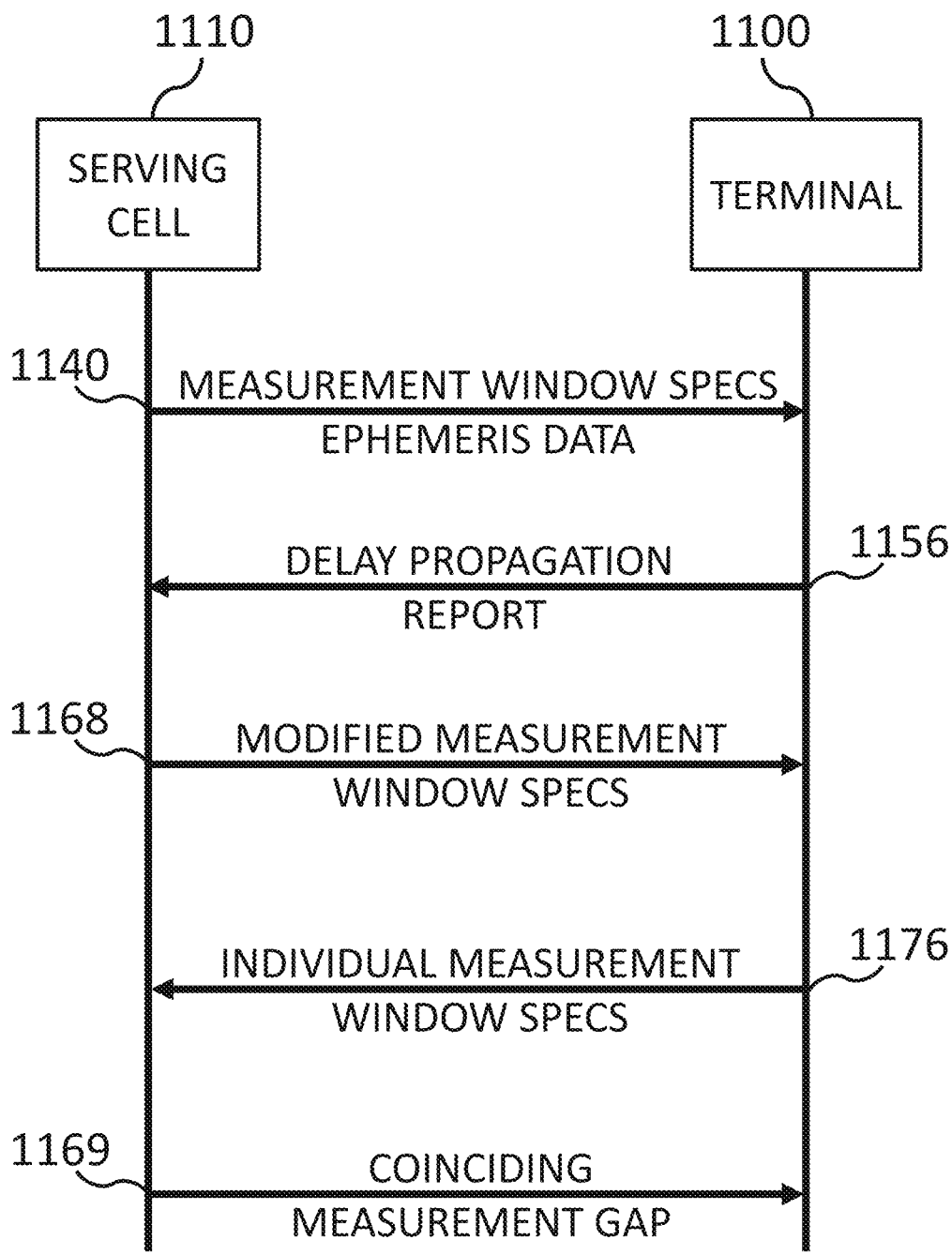
FIG. 11 is a further operational flow for compensating satellite signal propagation delay variation, according to at least one embodiment of the present invention.

FIG. 11 is a further operational flow for compensating satellite signal propagation delay variation, according to at least one embodiment of the present invention. In some embodiments, the operational flow provides a method of compensating satellite signal propagation delay variation by a terminal connected to a serving cell. In this embodiment, the operations are performed by a system including a serving cell 1110 and a terminal 1100, which is connected to serving cell 1110. In some embodiments, the transmissions between serving cell 1110 and terminal 1100 are through RRC signaling.

Serving cell 1110 transmits measurement window specifications and ephemeris data 1140 to terminal 1100. In some embodiments, serving cell 1110 also transmits a reporting condition. Terminal 1100 receives window specifications and ephemeris data 1140, and determines a delay propagation for each cell communicating with terminal 1100 through a satellite. In response to determining a significant difference in delay propagation between serving cell 1110 and any neighboring cells, or in response to a determination that meets other reporting conditions specified by the serving cell, terminal 1100 transmits a delay propagation report 1156 to the serving cell. In some embodiments, the delay propagation report includes more detailed information than propagation delay values, such as relative timings of measurement windows and measurement signals from the perspective of terminal 1100. Serving cell 1110 receives delay propagation report 1156, and modifies the cell measurement window specifications in response to delay propagation report 1156 including any indication that no measurements signals of one or more neighboring cells will arrive at terminal 1100 during any time frames defined by the cell measurement window specifications. In some embodiments, serving cell 1110 tries to modify the cell measurement window specifications so that at least one measurement signal from all neighboring cells will arrive within a measurement window from the perspective of terminal 1100, but there is no modification that will achieve this with an acceptable spectral efficiency. Serving cell 1110 transmits to terminal 1100 modified cell measurement window specifications 1168, which do not cause measurement signals from all neighboring cells to arrive within a measurement window from the perspective of terminal 1100. In response to receiving modified cell measurement window specifications 1168, terminal 1100 configures individual cell measurement window specifications 1176 to define measurements windows for receiving at least one measurement signal of any neighboring cells from which a measurement signal would not arrive within any time frames defined by modified cell measurement window specifications 1168. Terminal 1100 transmits individual cell measurement window specifications 1176 to serving cell 1110. Serving cell 1110 responds by transmitting coinciding measurement gap 1169, which confirms that serving cell 1110 will provide a measurement gap coinciding with any time frames defined by individual cell measurement windows specifications 1176.

In some embodiments of the system, serving cell 1110 does not transmit ephemeris data, collect propagation delay reports, or receive individual cell measurement window specifications. Instead, in these embodiments each connected terminal, such as terminal 1100, transmits to serving cell 1110 a geographic location of the terminal. In some of these embodiments, serving cell 1110 makes all determinations based on this information, including determining whether cell measurement window specifications need to be modified, determining modifications to cell measurement window specifications, and determining individual cell measurement window specifications. In such embodiments, serving cell 1110 utilizes more computational resources instead of the connected terminals, meaning it is more energy efficient for the connected terminals. However, in some embodiments where the connected terminals perform more determinations, the energy consumption is more balanced than in some embodiments in which serving cell 1110 performs all determinations. Also, in some embodiments where terminal 1100 is within a geographic territory where network collection of individual geographic location is prohibited, it is possible for terminal 1100 to not have capability of transmitting a geographic location to serving cell 1110. Furthermore, in some embodiments where connected terminals only send a geographic location, report conditions that require terminal determination cannot be used, requiring all terminals to send the geographic location at all times, rather than only when the delay becomes significant or surpasses a threshold.

Figure 12:
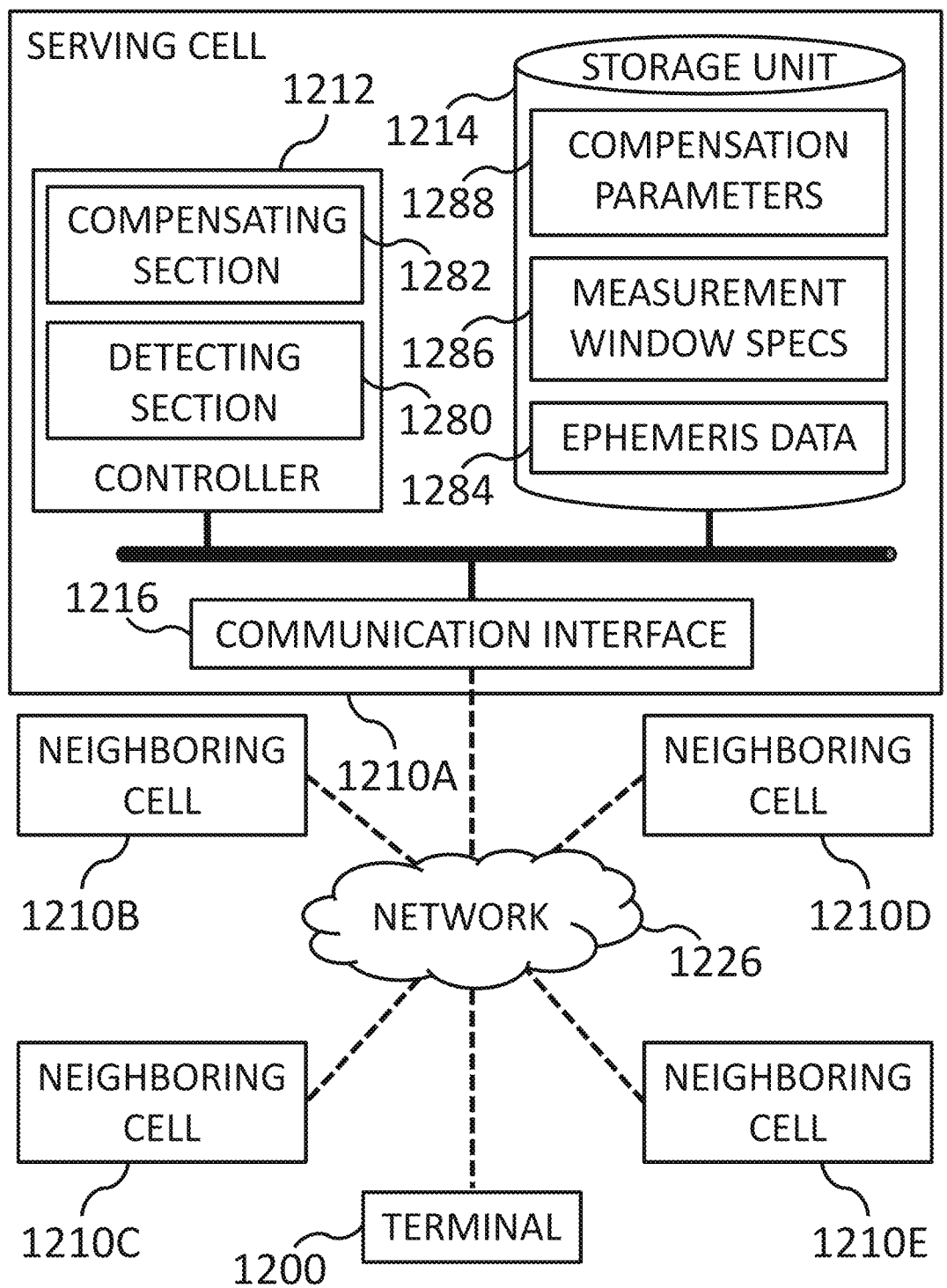
FIG. 12 is a block diagram of an exemplary hardware configuration of a serving cell for satellite signal propagation delay variation compensation, according to at least one embodiment of the present invention.

FIG. 12 is a block diagram of an exemplary hardware configuration of a serving cell for satellite signal propagation delay variation compensation, according to at least one embodiment of the present invention. The exemplary hardware configuration includes serving cell 1210A, which communicates with terminal 1200 and neighboring cells 1210B, 1210C, 1210D, and 1210E through cellular network 1226.

Serving cell 1210A includes a controller 1212, a storage unit 1214, and a communication interface 1216. In some embodiments, controller 1212 and storage unit 1214 are part of a client computer, a computer system that includes two or more computers, or a server mainframe that connects directly to serving cell 1210A.

In some embodiments, controller 1212 is a processor or programmable circuitry executing instructions to cause the processor or programmable circuitry to perform operations according to the instructions. In some embodiments, controller 1212 is analog or digital programmable circuitry, or any combination thereof. In some embodiments, controller 1212 is composed of physically separated storage or circuitry that interacts through communication. In some embodiments, storage unit 1214 is a non-volatile computer-readable medium capable of storing executable and non-executable data for access by controller 1212 during execution of the instructions. Communication interface 1216 transmits and receives data from network 1226.

Controller 1212 includes detecting section 1280 and compensating section 1282. Storage unit 1214 includes ephemeris data 1284, cell measurement window specifications 1286, and compensation parameters 1288.

Detecting section 1280 is the circuitry or instructions of controller 1212 that detects whether any connected terminals, such as terminal 1200, will not have any measurements signals from a neighboring cell, such as neighboring cells 1210B, 1210C, 1210D, and 1210E arriving at the connected terminal during time frames defined by cell measurement window specifications. In some embodiments, detecting section 1280 utilizes information in storage unit 1214, such as ephemeris data 1284 and cell measurement window specifications 1286. Detecting section 1280 may include sub-sections for performing additional functions, as described in the foregoing flow charts. Such sub-sections may be referred to by a name associated with their function.

Compensating section 1282 is the circuitry or instructions of controller 1212 that performs satellite signal propagation delay variation compensation. In some embodiments, compensating section 1282 modifies cell measurement window specifications to increase reception of neighboring cell measurement signals with an acceptable spectral efficiency. While performing compensation in some embodiments, compensating section 1282 utilizes information in storage unit 1214, such as cell measurement window specifications 1286 and compensation parameters 1288. Compensating section 1282 may include sub-sections for performing additional functions, as described in the foregoing flow charts. Such sub-sections may be referred to by a name associated with their function.

In other embodiments, the serving cell includes or is in direct communication with other devices capable of processing logical functions in order to perform the operations herein. In some embodiments, the controller and the storage unit are not entirely separate devices, but share circuitry or one or more computer-readable mediums. In some embodiments, the storage unit may be a hard drive storing both the computer-executable instructions and the data accessed by the controller, and the controller may be a combination of a central processing unit (CPU) and RAM, in which the computer-executable instructions may be copied in whole or in part for execution by the CPU during performance of the operations herein.

In embodiments where the serving cell utilizes a computer to perform the operations herein, a program that is installed in the computer causes the computer to function as or perform operations associated with serving cells of the embodiments described herein. In some embodiments, such a program may be executed by a processor to cause the computer to perform certain operations associated with some or all of the blocks of flowcharts and block diagrams described herein.

Figure 13:
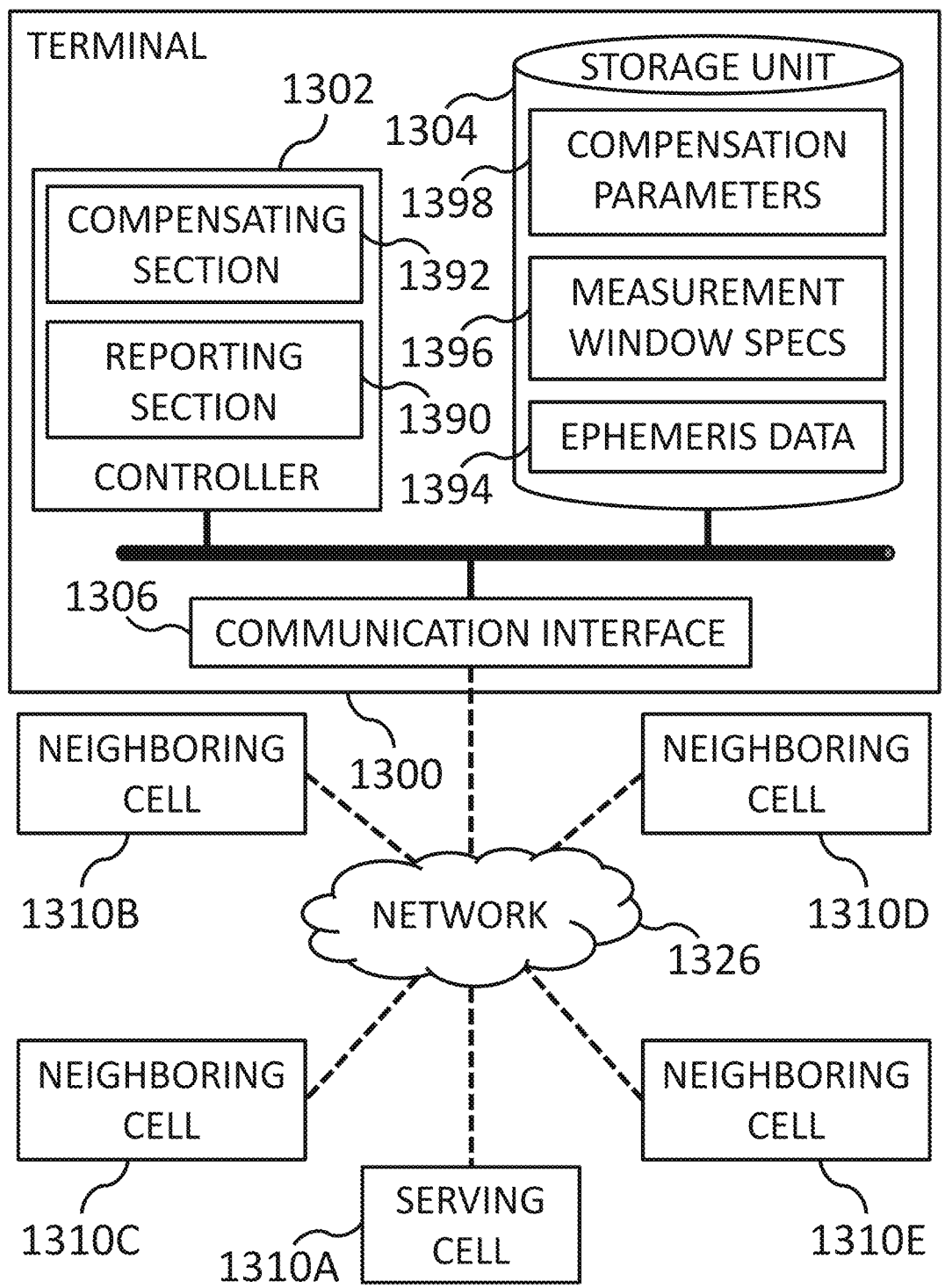
FIG. 13 is a block diagram of an exemplary hardware configuration of a terminal for satellite signal propagation delay variation compensation, according to at least one embodiment of the present invention.

FIG. 13 is a block diagram of an exemplary hardware configuration of a terminal for satellite signal propagation delay variation compensation, according to at least one embodiment of the present invention. The exemplary hardware configuration includes terminal 1300, which communicates with serving cell 1310A and neighboring cells 1310B, 1310C, 1310D, and 1310E through cellular network 1326.

Terminal 1300 includes a controller 1302, a storage unit 1304, and a communication interface 1306. In some embodiments, terminal 1300 is a cellular telephone, a smartphone, a tablet, a notebook computer, or any other device with a cellular network communication interface.

In some embodiments, controller 1302 is a processor or programmable circuitry executing instructions to cause the processor or programmable circuitry to perform operations according to the instructions. In some embodiments, controller 1302 is analog or digital programmable circuitry, or any combination thereof. In some embodiments, controller 1302 is composed of physically separated storage or circuitry that interacts through communication. In some embodiments, storage unit 1304 is a non-volatile computer-readable medium capable of storing executable and non-executable data for access by controller 1302 during execution of the instructions. Communication interface 1306 transmits and receives data from network 1326.

Controller 1302 includes reporting section 1390 and compensating section 1392. Storage unit 1304 includes ephemeris data 1394, cell measurement window specifications 1396, and compensation parameters 1398.

Reporting section 1390 is the circuitry or instructions of controller 1302 that reports whether the measurement signals of any neighboring cell, such as neighboring cells 1310B, 1310C, 1310D, and 1310E, are not arriving at terminal 1300 during time frames defined by cell measurement window specifications. In some embodiments, reporting section 1390 utilizes information in storage unit 1304, such as ephemeris data 1394 and cell measurement window specifications 1396. Reporting section 1390 may include sub-sections for performing additional functions, as described in the foregoing flow charts. Such sub-sections may be referred to by a name associated with their function.

Compensating section 1392 is the circuitry or instructions of controller 1302 that performs satellite signal propagation delay variation compensation. In some embodiments, compensating section 1392 configures individual cell measurement window specifications to receive measurements signals of any neighboring cells that would otherwise not be received according to cell measurement window specifications. While performing compensation in some embodiments, compensating section 1392 utilizes information in storage unit 1304, such as cell measurement window specifications 1396 and compensation parameters 1398. Compensating section 1392 may include sub-sections for performing additional functions, as described in the foregoing flow charts. Such sub-sections may be referred to by a name associated with their function.

In other embodiments, the terminal includes other devices capable of processing logical functions in order to perform the operations herein. In some embodiments, the controller and the storage unit are not entirely separate devices, but share circuitry or one or more computer-readable mediums.

In some embodiments, the storage unit may be a hard drive storing both the computer-executable instructions and the data accessed by the controller, and the controller may be a combination of a central processing unit (CPU) and RAM, in which the computer-executable instructions may be copied in whole or in part for execution by the CPU during performance of the operations herein.

In embodiments where the terminal utilizes a computer processor to perform the operations herein, a program that is installed in the terminal causes the terminal to function as or perform operations of the embodiments described herein. In some embodiments, such a program may be executed by the computer processor to cause the terminal to perform certain operations associated with some or all of the blocks of flowcharts and block diagrams described herein.

Various embodiments of the present invention are described with reference to flowcharts and block diagrams whose blocks may represent (1) steps of processes in which operations are performed or (2) sections of a controller responsible for performing operations. Certain steps and sections are implemented by dedicated circuitry, programmable circuitry supplied with computer-readable instructions stored on computer-readable media, and/or processors supplied with computer-readable instructions stored on computer-readable media. In some embodiments, dedicated circuitry includes digital and/or analog hardware circuits and may include integrated circuits (IC) and/or discrete circuits. In some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

Various embodiments of the present invention include a system, a method, and/or a computer program product. In some embodiments, the computer program product includes a computer readable storage medium (or media) having computer readable program instructions thereon for causing a processor to carry out aspects of the present invention.

In some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein are downloadable to respective computing/processing devices from a computer readable storage medium or to an external computer or external storage device via a network, for example, the Internet, a local area network, a wide area network and/or a wireless network. In some embodiments, the network may includes copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, the computer readable program instructions are executed entirely on the user's computer, partly on the user's computer, as a stand-alone software package, partly on the user's computer and partly on a remote computer or entirely on the remote computer or server. In some embodiments, in the latter scenario, the remote computer is connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. It will be apparent to persons skilled in the art that various alterations and improvements can be added to the above-described embodiments. It will also be apparent from the scope of the claims that the embodiments added with such alterations or improvements are included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the processes must be performed in this order.

According to at least one embodiment of the present invention, satellite signal propagation delay variation can be compensated by transmitting ephemeris data of a satellite and cell measurement window specifications to a terminal, receiving an indication from the terminal that a cell measurement signal will arrive at the terminal outside of a time frame defined by the cell measurement window specifications, modifying the cell measurement window specifications based on a difference in propagation delay between a serving cell, which defines the cell measurement window specifications, and a neighboring cell, which transmits the cell measurement signal, so that the cell measurement signal will arrive at the terminal within the time frame defined by the cell measurement window specifications, the satellite providing communication with the terminal for at least one of the serving cell and the neighboring cell, and transmitting modified cell measurement window specifications to the terminal.

Some embodiments include the instructions in a computer program, the method performed by the processor executing the instructions of the computer program, and a serving cell that performs the method. In some embodiments, the serving cell includes a controller including circuitry configured to perform the operations in the instructions.

According to at least one embodiment of the present invention, satellite signal propagation delay variation can be compensated by receiving ephemeris data of a satellite and cell measurement window specifications from a serving cell of a cellular network, determining whether a cell measurement signal transmitted from a neighboring cell will be received outside of a time frame defined by the cell measurement window specifications based on a difference in propagation delay between the serving cell and the neighboring cell, and transmitting an indication to the serving cell that the cell measurement signal will be received outside of the window defined by the cell measurement window specifications.

Some embodiments include the instructions in a computer program, the method performed by the processor executing the instructions of the computer program, and a terminal that performs the method. In some embodiments, the terminal includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions that are executable by a computer to cause the computer to perform operations comprising:
    transmitting ephemeris data of a satellite and cell measurement window specifications to a terminal;
    receiving an indication from the terminal that a cell measurement signal will arrive at the terminal outside of a time frame defined by the cell measurement window specifications;
    modifying the cell measurement window specifications based on a difference in propagation delay between a serving cell, which defines the cell measurement window specifications, and a neighboring cell, which transmits the cell measurement signal, so that the cell measurement signal will arrive at the terminal within the time frame defined by the cell measurement window specifications, the satellite providing communication with the terminal for at least one of the serving cell and the neighboring cell; and transmitting modified cell measurement window specifications to the terminal;

wherein the modifying the cell measurement window specifications includes determining that a spectral efficiency of the modified cell measurement window specifications is above a threshold spectral efficiency value.

2. The non-transitory computer-readable medium of claim 1, wherein the modifying the cell measurement window specifications includes modifying at least one of periodicity, duration, or offset.

3. The non-transitory computer-readable medium of claim 1, wherein the modifying the cell measurement window specifications includes specifying additional measurement window specifications.

4. The non-transitory computer-readable medium of claim 1, wherein the ephemeris data includes position of the satellite, velocity of the satellite, and relative cell position within the satellite.

5. The non-transitory computer-readable medium of claim 1, wherein the indication includes a delay difference value representing the difference in propagation delay.

6. The non-transitory computer-readable medium of claim 5, wherein the operations include determining the difference in propagation delay based on the ephemeris data and a geographic location of the terminal.

7. The non-transitory computer-readable medium of claim 6, wherein the satellite relays communication between the terminal and one of the serving cell or the neighboring cell, the one of the serving cell and the neighboring cell having a terrestrial location, and the determining the difference in propagation delay is further based on the terrestrial location.

8. The non-transitory computer-readable medium of claim 1, wherein the operations further comprise receiving, from the terminal, individual measurement window specifications, and providing a measurement gap for the terminal based on the individual measurement window specifications.

9. A non-transitory computer-readable medium including instructions that are executable by a computer to cause the computer to perform operations comprising:

receiving ephemeris data of a satellite and cell measurement window specifications from a serving cell of a cellular network, wherein the ephemeris data includes position of the satellite, velocity of the satellite, and relative cell position within the satellite;

determining whether a cell measurement signal transmitted from a neighboring cell will be received outside of a time frame defined by the cell measurement window specifications based on a difference in propagation delay between the serving cell and the neighboring cell;

determining the difference in propagation delay based on the ephemeris data and a geographic location of a terminal receiving the cell measurement signal;

receiving a threshold delay difference value;

determining whether the difference in propagation delay is greater than the threshold delay difference value; and transmitting an indication to the serving cell that the cell measurement signal will be received outside of the window defined by the cell measurement window specifications in response to determining that the propagation delay is greater than the threshold delay difference value.

10. The non-transitory computer-readable medium of claim 9, wherein the operations further comprise:

receiving modified cell measurement window specifications;

determining that the cell measurement signal transmitted from the satellite will not be received within a time frame defined by the modified cell measurement window specifications;

configuring individual cell measurement window specifications based on a time of arrival of the cell measurement signal; and transmitting the individual cell measurement window specifications to the serving cell.

11. The non-transitory computer-readable medium of claim 9, wherein the satellite relays communication between the terminal and one of the serving cell or the neighboring cell, the one of the serving cell and the neighboring cell having a terrestrial location, and the determining the difference in propagation delay is further based on the terrestrial location.

12. An apparatus comprising:

a controller including circuitry configured to transmit ephemeris data of a satellite and cell measurement window specifications to a terminal;

receive an indication from the terminal that a cell measurement signal will arrive at the terminal outside of a time frame defined by the cell measurement window specifications;

modify the cell measurement window specifications based on a difference in propagation delay between a serving cell, which defines the cell measurement window specifications, and a neighboring cell, which transmits the cell measurement signal, so that the cell measurement signal transmitted from the satellite will arrive at the terminal within the time frame defined by the cell measurement window specifications, the satellite providing communication with the terminal for at least one of the serving cell and the neighboring cell;

determine that a spectral efficiency of the modified cell measurement window specifications is above a threshold spectral efficiency value; and transmit modified cell measurement window specifications to the terminal.

13. The apparatus of claim 12, wherein the circuitry is further configured to modify the cell measurement window specifications to modify at least one of periodicity, duration, or offset.

14. The apparatus of claim 12, wherein the circuitry is further configured to specify additional measurement window specifications.

15. The apparatus of claim 12, wherein the ephemeris data includes position of the satellite, velocity of the satellite, and relative cell position within the satellite.

* * * * *